United States Patent
Handschuh et al.

(10) Patent No.: US 9,004,904 B2
(45) Date of Patent: Apr. 14, 2015

(54) APPARATUS FOR MOULDING PLASTIC PREFORMS

(75) Inventors: Eduard Handschuh, Regonsburg (DE); Juergen Soellner, Berstzhausen (DE)

(73) Assignee: Krones AG (DE)

( * ) Notice: Subject to any disclaimer, the term of this patent is extended or adjusted under 35 U.S.C. 154(b) by 283 days.

(21) Appl. No.: 13/463,650

(22) Filed: May 3, 2012

(65) Prior Publication Data

US 2012/0286456 A1 Nov. 15, 2012

(30) Foreign Application Priority Data

May 11, 2011 (DE) .......................... 10 2011 101 259

(51) Int. Cl.
| | |
|---|---|
| *B29C 49/42* | (2006.01) |
| *B29C 49/78* | (2006.01) |
| *B29C 49/36* | (2006.01) |
| *B29C 49/46* | (2006.01) |

(52) U.S. Cl.
CPC ............. *B29C 49/4289* (2013.01); *B29C 49/36* (2013.01); *B29C 2049/4697* (2013.01); *B29C 49/4284* (2013.01); *B29C 49/78* (2013.01); *B29C 49/783* (2013.01); *Y10S 425/811* (2013.01)

(58) Field of Classification Search
None
See application file for complete search history.

(56) References Cited

U.S. PATENT DOCUMENTS

| | | | |
|---|---|---|---|
| 4,989,649 A * | 2/1991 | Weiler et al. ....................... | 141/1 |
| 7,320,586 B2 | 1/2008 | Storione et al. ................ | 425/535 |
| 2004/0173949 A1 | 9/2004 | Storione et al. ................ | 264/529 |
| 2011/0089614 A1 | 4/2011 | Hirdina ........................ | 264/529 |
| 2011/0133369 A1 | 6/2011 | Martini et al. ................. | 264/523 |

FOREIGN PATENT DOCUMENTS

| | | | | |
|---|---|---|---|---|
| CN | 1533326 | | 9/2004 | ............. B29C 49/16 |
| CN | 200961745 | | 10/2007 | ............. F16K 17/04 |
| CN | 200961754 | | 10/2007 | ............. F16L 3/22 |
| DE | 10 2004 014 653 | | 10/2005 | ............. B29C 49/18 |
| DE | 10 2007 015 105 | | 10/2008 | ............. B29C 49/46 |
| DE | 102008038141 | | 2/2010 | ............. B29C 49/46 |
| EP | 1271029 | | 1/2003 | ............ F16K 31/122 |
| WO | WO 96/18541 | | 6/1996 | ............. B65B 55/02 |
| WO | WO 96/25285 | | 8/1996 | ............. B29C 49/78 |
| WO | WO 2007/041873 | | 4/2007 | ............. F16K 31/42 |
| WO | WO 2009/010024 | | 1/2009 | ............. B29C 49/42 |
| WO | WO 2010/020529 | | 2/2010 | ............. B29C 49/36 |

OTHER PUBLICATIONS

Chinese Office Action issued in corresponding Chine Patent Appln. No. 201210147616.2, English Translation (6 pgs).
European Office Action issued in corresponding EPO Patent Appln. No. 12167261.2-1703 dated Sep. 5, 2014 (8 pgs).
German Search Report issued in Application No. 10 2011 101 259.5 dated Jan. 19, 2012 (5 pgs).
Chinese Second Office Action issued in related application No. 201210147616.2, dated Sep. 29, 2014 (2 pgs).

* cited by examiner

*Primary Examiner* — Benjamin Schiffman
(74) *Attorney, Agent, or Firm* — Hayes Soloway P.C.

(57) ABSTRACT

An apparatus for molding plastic preforms into plastic containers, includes a clean room, at least one blow station having a blow mold for shaping the plastic preforms by at least one process pressure, and a venting device for venting or reducing the process pressure into the atmosphere. The venting device has at least one venting valve through which pressure can be vented into the atmosphere via a sound absorber, and a pressure drop safety device for closing the venting valve before the atmospheric pressure level on the venting device is reached.

11 Claims, 3 Drawing Sheets

APPARATUS FOR MOULDING PLASTIC PREFORMS

BACKGROUND OF THE INVENTION

The invention relates on the one hand to an apparatus for moulding plastic preforms into plastic containers, comprising a clean room, at least one blow station comprising a blow mould for shaping the plastic preforms by means of at least one process pressure, and a venting device for venting the process pressure or a process pressure reduced to a recovery pressure into the atmosphere, which venting device comprises at least one venting valve, by means of which the process pressure or the recovery pressure can be vented into the atmosphere via a sound absorber.

On the other hand, the invention relates to a method for moulding plastic preforms into plastic containers using a blow mould in a clean room, wherein the plastic preforms are moulded in the blow mould by means of a first process pressure, wherein the pre-moulded plastic preforms are subsequently finish-moulded in the blow mould by means of a second process pressure, and wherein the second process pressure is vented into the atmosphere via a venting valve immediately after finish-moulding or is reduced to a recovery pressure and the recovery pressure is vented into the atmosphere via the venting valve.

Generic apparatus and methods are well known from the prior art.

For example, international patent application WO 2010/020529 A2 describes an apparatus for moulding plastic preforms into plastic containers, which comprises a conveying device with a plurality of blow stations and a clean room. The clean room can be used to ensure good aseptic conditions during the production of the plastic preforms and also during the filling thereof with beverages. In order to be able to reduce the sterilisation efforts in this respect, the area of the conveying device on the moulding apparatus, where the blow stations are arranged, is disposed within the clean room and at least one further area of the conveying device is disposed outside of the clean room. In this way, particularly the size of the clean room can be reduced, as a result of which the areas to be sterilised on the moulding apparatus can be kept particularly small. The subject matter of WO 2010/020529 A1 is herewith included in its entirety by reference in the subject matter of the present description.

From European patent specification EP 1 271 029 B1, an apparatus comprising a blow station for blow moulding containers is known, wherein a blow pressure for blow moulding the containers is controlled by a modified device for the pneumatic control of a blow pressure, as a result of which a control pressure required for the device can advantageously be reduced.

In addition, an apparatus for blow moulding preforms in particular into bottles by means of a process pressure is known from patent specification U.S. Pat. No. 7,320,586 B2, according to which the process pressure can be at least partially recovered as a recovery pressure in a pressure vessel provided for this purpose, before a correspondingly reduced residual pressure is vented into the open environment.

As a rule, the process pressures required for moulding are wholly or partially vented into the environment via corresponding sound absorbers, in order to achieve in this way a reduction of the sound level in an advantageous manner. Such sound absorbers are often designed as multi-layered structures and as a result have a large number of gaps in which especially germs can grow. In this respect there is a risk that the germs will spread in particular starting from the sound absorber into the clean room and can contaminate the devices or preforms and/or finish-expanded containers present there. For this reason, in particular the sound absorbers are serviced or replaced with an appropriate frequency which, however, is cumbersome and moreover incurs large costs.

It is the object of the present invention to avoid this drawback.

According to a first aspect of the invention, the present object is achieved by means of an apparatus for moulding plastic preforms into plastic containers, which comprises a clean room, at least one blow station comprising a blow mould for shaping the plastic preforms by means of at least one process pressure, and a venting device for venting the process pressure or a process pressure reduced to a recovery pressure into the atmosphere, wherein the venting device comprises at least one venting valve, by means of which the process pressure or the recovery pressure can be vented into the atmosphere via a sound absorber, said apparatus being characterised by a pressure drop safety device for closing the venting valve before the atmospheric pressure level on the venting device is reached.

By means of the pressure drop safety device according to the invention it is ensured in an advantageous manner that on the venting valve, a flow direction of a pressure means for moulding the plastic preforms will always only be directed out of the venting device, as a result of which it is prevented in a constructively very simple manner that germs from outside of the clean room can get through the venting device, in particular through the venting valve, into the clean room and can contaminate said clean room.

Insofar it is advantageous if the venting valve is closed before atmospheric pressure is reached. This reduces the risk of germs getting into a plastic container or into a sterile zone of the present apparatus. Preferably, the venting valve is closed at the latest when a predefined positive pressure is reached in the finish-blown plastic container, as will be explained below. This measure ensures an air flow in just one direction and thus prevents the spreading of germs in the direction of the plastic container. Ideally, any residual pressure will be vented out of the plastic container when a corresponding blow nozzle is lifted off. This allows in an advantageous manner the use of hygienically non-optimised sound absorbers.

The object of the invention is also achieved by means of a method for moulding plastic preforms into plastic containers using a blow mould in a clean room, wherein the plastic preforms are pre-moulded in the blow mould by means of a first process pressure, wherein the pre-moulded plastic preforms are subsequently finish-moulded in the blow mould by means of a second process pressure, and wherein the second process pressure is vented into the atmosphere via a venting valve immediately after finish-moulding or is reduced to a recovery pressure and the recovery pressure is vented into the atmosphere via the venting valve, said method being characterised in that the venting valve is closed whilst the process pressure or the recovery pressure is being vented, before or as the atmospheric pressure level is reached.

Ideally, the venting valve will already be closed during a venting process before the atmospheric pressure level is reached, as a result of which any contamination can be precluded.

With regard to an alternative process, the venting valve could also be closed whilst the atmospheric pressure level is being reached, but this would cause an increased risk of germs spreading into the venting valve and in the direction of the clean room.

According to a further aspect of the invention, the present object is achieved also by means of an apparatus for moulding plastic preforms into plastic containers, which comprises a clean room, at least one blow station comprising a blow mould for shaping the plastic preforms by means of at least one process pressure, and a venting device for venting the process pressure or a process pressure reduced to a recovery pressure into the atmosphere, wherein the venting device comprises at least one venting valve, by means of which the process pressure or the recovery pressure can be vented into the atmosphere via a sound absorber, said apparatus being characterised in that the venting device includes a pressure drop safety device with means for maintaining an anti-contamination pressure at least on the venting valve, said anti-contamination pressure being between the process pressure or recovery pressure and atmospheric pressure.

Contamination of components and/or assemblies of the moulding apparatus within the clean room is prevented in a particularly simple manner by maintaining the pressure in particular in the venting device always above atmospheric pressure until the venting valve is closed.

By means of this bodiless germ barrier, any crossing over of germs from outside of the clean room into the clean room can be prevented in an extraordinarily simple manner. In particular, the bodiless germ barrier proposed herein is substantially maintenance free.

Preferably, in particular on the venting valve prior to it being closed, there will always be an anti-contamination pressure at a level between the process or recovery pressure and atmospheric pressure.

In this respect, an advantageous process variant provides for an anti-contamination pressure that is always above atmospheric pressure to be at least temporarily adjusted at a connection side of the venting valve, which faces the blow mould.

Moreover, it is advantageous for the anti-contamination pressure to be at a level of less than 5 bar, preferably at a level of less than 2 bar, so that this low pressure can advantageously be vented also by lifting off a blow nozzle directly on the blow station in a constructively simple manner. As a result, a further venting valve within the clean room may be dispensed with.

A further advantageous process variant provides for the anti-contamination pressure to be vented into the clean room and in particular on the plastic container, as a result of which a relief of the overall pressure can be achieved in a particularly simple manner from a process engineering point of view.

It goes without saying that the pressure drop safety device according to the invention and in particular also the means thereof for maintaining the anti-contamination pressure may be designed in a variety of ways.

A first embodiment, which is particularly simple in design, provides for the pressure drop safety device for closing the venting valve to comprise a mechanical pre-tension spring for a mechanically actuatable valve piston, in particular for a spring-loaded valve piston. This variant is particularly trouble-free and therefore also very low in maintenance.

The spring-loading can here be adjusted in such a way that once a predefined process pressure in the plastic container has been reached, the valve piston is displaced by spring force into a closing position.

Advantageously, the strength of such a pre-tension spring is selected or adjusted as a function of a desired closing time of the venting valve or of a desired anti-contamination pressure. A pretension of the spring can be pre-adjusted by means of a mechanism.

With regard to an alternative embodiment it is advantageous if for closing the venting valve, the pressure drop safety device comprises a pneumatic pre-tension spring for a valve piston that can be actuated in a contactless manner, in particular a pneumatically spring-loaded valve piston. As a result, a particularly low-friction pre-tension spring can be realised.

Such a pneumatic pre-tensioning constitutes an additional control piston. The air pressure can be adjusted by means of a pressure controller in such a way that once a predefined process pressure in the plastic container is reached, the valve piston closes as a result of pneumatic pretension. In order to be able, if necessary, to dispense with the additional pressure controller for pneumatic pre-tensioning, the control air that is already present on the apparatus could be used.

Here, a pneumatic pre-tensioning piston diameter may be selected such that the venting valve closes once the predefined process pressure in the plastic container is reached. In this respect, the closing force can be adapted in a constructively simple manner via the level of pressurised air and/or via the size of the piston diameter.

A further preferred embodiment provides for the pressure drop safety device for closing the venting valve to comprise a valve piston that can be actuated by means of a pneumatic control valve, which pneumatic control valve is controllable as a function of an anti-contamination pressure. As a result, an extraordinarily high level of flexibility can be achieved when adjusting the anti-contamination pressure or a closure time of the venting valve.

The pressure drop safety device may be realised in a constructively very simple manner if the pressure drop safety device comprises the venting valve. As a result, the pressure drop safety device may advantageously be at least partially integrated straight into the existing venting valve.

In order to be able to close the venting valve at the right time before atmospheric pressure is reached, it is advantageous if the pressure drop safety device comprises means for detecting a process pressure or recovery pressure on the clean room side and/or on the blow mould side.

If necessary, any pressure sensors already present on the moulding apparatus may be used for this purpose.

In addition or alternatively, a check valve may be provided on or in the area of the venting device. By means of such a check valve, any risk of an air flow directed into the clean room may also be reduced.

BRIEF DESCRIPTION OF THE DRAWINGS

Further advantages, objectives and characteristics of the present invention will be explained by means of the attached drawings and the description that follows below, in which by way of example a moulding apparatus and various venting valves having pressure drop safety devices that operate in different ways are depicted and described, wherein.

DETAILED DESCRIPTION OF THE INVENTION

Figure 1:
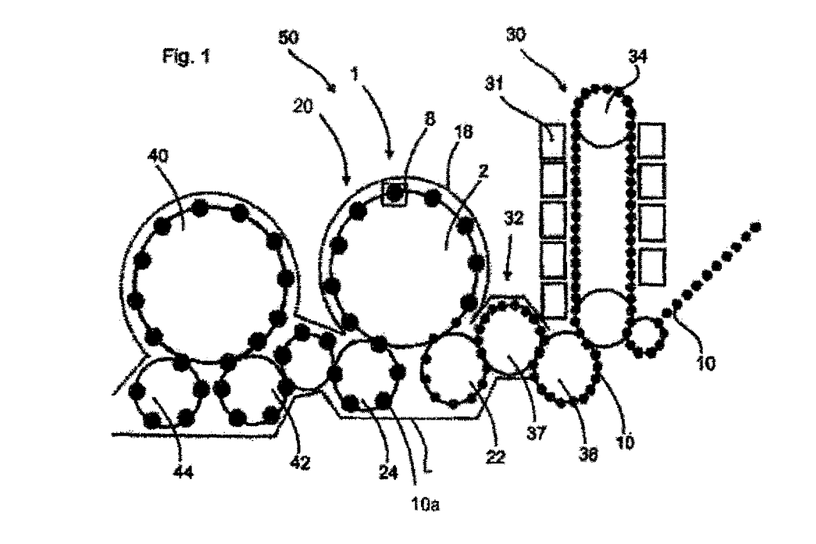
FIG. 1 shows a schematic view of a system for producing plastic containers, which comprises a blow station provided in a clean room.

FIG. 1 shows a schematic view of a system for producing plastic containers. This system 50 includes a heating device 30 in which plastic preforms 10 are heated. In this process, these plastic preforms 10 are guided through this heating device 30 by means of a conveying device 34, here a revolving chain, and in the course of this are heated by a plurality of heating elements 31. This heating device 30 is followed by a transfer unit 36 that transfers the preforms 10 to a sterilisation device 32. This sterilisation device 32 has here also a transport wheel 37, on which transport wheel 37, or in a stationary manner, sterilisation elements may be disposed. This area allows for example sterilisation by means of hydrogen peroxide gas or, as mentioned above, by means of electromagnetic or UV radiation to be carried out. In this area, in particular internal sterilisation of the preforms is carried out.

Reference numeral 20 identifies in its entirety a clean room, the outer boundaries of which are here indicated by a dotted line L. In a further preferred embodiment, the clean room 20 is not only disposed in the area of the transport wheel 2 and the filling device 40, but may start as early as in the area of the heating device 30, of the sterilisation device 32, of the plastic preform supply and/or of plastic preform production. It can be seen that this clean room 20 starts in the area of the sterilisation device 32. In this area, sluice devices may be provided in order to introduce the plastic preforms into the clean room 20 without too much gas flowing out of the clean room 20 and thus getting lost.

The clean room 20, as indicated by the dashed line L, is adapted to the outer contour of the individual system components. In this way, the volume of the clean room may be reduced.

Reference numeral 1 identifies a moulding apparatus in its entirety, wherein a plurality of blow stations 8 is arranged on a transport wheel 2, but only one of these blow stations 8 is shown herein. These blow stations 8 are used to expand the plastic preforms 10 into containers 10a. Although not shown here in detail, not the entire area of the conveying device 2 is located within the clean room 20, but the clean room 20 or isolator is realised as it were as a mini-isolator within the entire apparatus. In this way it would be possible for the clean room to be implemented in the form of a channel at least in the area of the moulding apparatus 1.

Reference numeral 22 relates to a supply device that hands the preforms over to the moulding device 1, and reference numeral 24 relates to a discharge device that discharges the produced plastic containers 10a from the moulding apparatus 1. It can be seen that the clean room 20 has recesses respectively in the area of the supply device 22 and of the discharge device 24, which recesses receive said devices 22, 24. In this way, a handover of the plastic preforms 10 to the moulding apparatus 1 or a takeover of the plastic containers 10a from the moulding apparatus 1 can be achieved in a particularly advantageous manner.

The transfer unit 42 is used to transfer the expanded plastic containers to a filling device 40, and from this filling device 40 they are subsequently carried off by a further conveying unit 44. In this context, the filling device 40 is also located within said clean room 20. Also in the case of the filling device it would be possible that not the entire filling device 40, which might have for example a reservoir for a beverage, is disposed entirely within the clean room 20, but here, too, only those areas in which the containers are actually conveyed. In this respect, the filling device could also be designed in a manner similar to the apparatus 1 for moulding plastic preforms 10.

As mentioned, the clean room 20 is reduced to an area as small as possible in the region of the apparatus 1, namely substantially to the blow stations 8 themselves. As a result of this compact design of the clean room 20, the production of a clean room becomes altogether faster and easier and also keeping it sterile during the operation phase becomes less cumbersome. Also, less sterile air is needed, so that smaller filter systems may be used and the risk of an uncontrolled formation of vortices is reduced as well.

Figure 2:
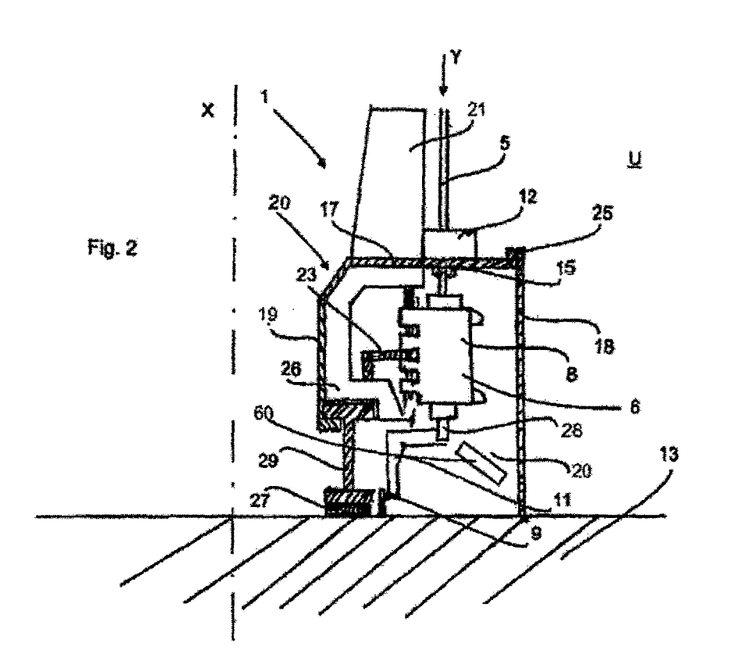
FIG. 2 shows a schematic detailed view of the clean room in the area of the blow station from FIG. 1.

FIG. 2 shows a detailed view of the apparatus 1 in the area of a blow station 8. A plurality of such blow stations 8 is rotationally moved about an axis X by means of a transport device 2 (i.e. the carrier 2). As can be seen in FIG. 2, the blow station 8 is guided within the clean room 20, which is here implemented in the form of a channel. This clean room 20 is terminated by a movable lateral wall 19 and a cover 17 formed integrally with this lateral wall 19. This lateral wall 19 and the cover 17 rotate here together with the blow station 8.

Reference numeral 18 relates to a further wall that delimits the clean room 20. This wall 18 is here an outer wall that is disposed to be stationary. Between the cover 17 and the wall 18, a sealing device 25 is provided which seals against each other the elements 17 and 18 that are movable relative to each other, for example, as mentioned above, by means of a surge tank. The lower region of the wall 18 is stationary and is disposed in a sealing manner on a base 13. Within the clean room 20 and here resting directly on the wall 19, a carrier 26 is provided which also moves in a rotating manner and on which again a holding device 23 for holding the blow station 8 is provided.

Reference numeral 11 relates to a follower device that can be actuated by a guiding curve 9 in order to open and close the blow station on its way through the clean room 20, in order to insert in particular the plastic preform into the blow station and also to remove it therefrom. A guiding curve 9 is also provided within the clean room 20. However, it would for example also be possible to take a section 28 below the individual blow stations 8 out of the clean room 20.

The guiding curve could here be disposed for example below the clean room 20 and/or laterally offset from the clean room 20 or above the clean room 20. The conveying device 2 may include further elements which are disposed above the clean room 20.

The carrier 26 is here disposed to be fixed on a holding body 29 and this holding body in turn is movable relative to the base 13. Reference numeral 27 relates here to a further sealing device that seals the areas 13 and 29 which are movable relative to each other also in this area.

Reference numeral 5 relates to a stretching rod that is movable relative to the blow station, in order to stretch the plastic preforms 10 in the longitudinal direction thereof. A carriage 12 is here arranged on the cover 17, in relation to which carriage the stretching rod is movable in the direction Y. Reference numeral 21 relates to a further bracket for this carriage 12 of the stretching rod 5.

It can be seen that certain areas of the stretching rod 5 are located during the blowing process both outside of the clean room 20 and inside of the clean room. To this end it is possible to provide a protection device such as a folding belows outside of the clean room 20 or above the carriage 12, which folding belows surrounds the stretching rod 5 so that no area of the stretching rod 5 comes into direct contact with the outside environment.

Each of the individual blow stations or moulding stations 8 has a blow mould carrier 6, within which the blow moulds (not shown in FIG. 2) are arranged. As is known from the prior art, these blow mould carriers may here include two blow mould carrier parts which can be pivoted relative to each other by means of a common pivot shaft 3 for opening and closing the blow mould.

Reference numeral 60 identifies here an application device used for applying the flowable sterilisation agent to the moulding stations. This application device 60 may be located on the transport wheel 2 or on the stationary wall 18 or may be arranged to be generally stationary and may have nozzles or the like. In addition it is advantageous to introduce, via the ventilation system, sterile air into the clean room 20 for sterilising the clean room 20.

Alternatively or additionally, however, the application device may also be a device that applies (in particular electromagnetic) radiation, e.g. UV or electron radiation onto the moulding stations. In this case, at least one area of the sealing device would advantageously be accessible to this electromagnetic radiation in an assembled condition of the components.

The two interconnected components are now disposed within the clean room. Some examples of components arranged relative to each other according to the invention will now be explained below. The components may for example be a blow mould carrier having a blow mould disposed thereon or they may be components of a closing mechanism which are arranged on each other for closing the blow moulds. In general, however, the invention is to be applied to any desired components, in particular components that are arranged on each other within the sterile room, or to components which are disposed on an (internal) wall of the sterile room or to components that are disposed partially outside and partially inside of the sterile room. Reference sign U in FIG. 2 relates to an (non-sterile) environment of the clean room 20.

However, it would also be possible (unlike what is shown in FIG. 2) and preferred if the conveying device 2 or the carrier includes a C-shaped outer circumference which also partially forms the outer walls of the clean room. Thus, the clean room wall, which is here C-shaped, rotates together with the conveying device 2, i.e. the blow wheel. In this embodiment, the lower boundary of the clean room is spaced apart from the base 13 and moves relative to the base. In this way, the clean room may be designed to be even smaller than shown in FIG. 2. A sealing of this C-shaped profile of the conveying device, which forms here both an internal wall and a lower and upper cover of the clean room, is here preferably carried out only in relation to the outer wall of the clean room. This outer wall is here advantageously arranged to be stationary.

Figure 3:
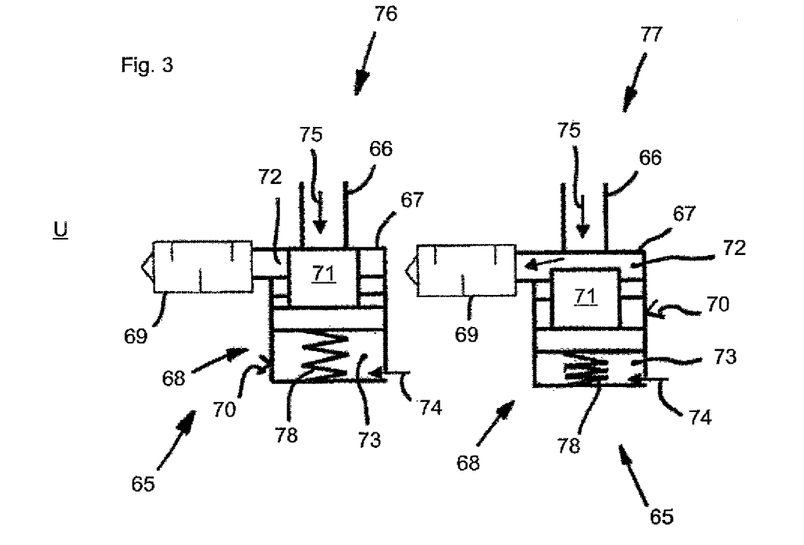
FIG. 3 shows a schematic view of a first embodiment example of a venting valve having a pressure drop safety device comprising a spring-loaded valve piston in the closed and the open positions.

The venting device 65 shown in FIG. 3 comprises a pressurised line section 66 of a blow station 8 of the moulding apparatus 1 from FIGS. 1 and 2, a venting valve 67 having a pressure drop safety device 68 and a sound absorber 69 for reducing a sound level whilst the process pressure or a recovery pressure is vented.

The venting valve 67 has a valve cylinder 70, a valve piston 71, a connection chamber 72 and a control pressure chamber 73.

A control pressure 74 can be applied to the control pressure chamber 73, and this control pressure can be used to hold the valve piston 71 in a closing position 76 against a process pressure 75.

If the control pressure 74 is absent, the valve piston 71 is transferred by the process pressure 75 into an open position 77, and the process pressure 75 can be vented into the environment U via the sound absorber 69.

The pressure drop safety device 68 comprises a mechanical pre-tension spring 78, by means of which the valve piston 71 can be automatically transferred into the closing position 76 without the support of control pressure 74, if the process pressure 75 falls below a desired anti-contamination pressure.

In this way it is ensured that the venting valve 67 will always be closed before the process pressure 75 can drop down to the atmospheric pressure level of the environment U.

In this way, the spreading of germs in particular from the sound absorber 69 to the pressurised line portion 66 may be prevented.

Figure 4:
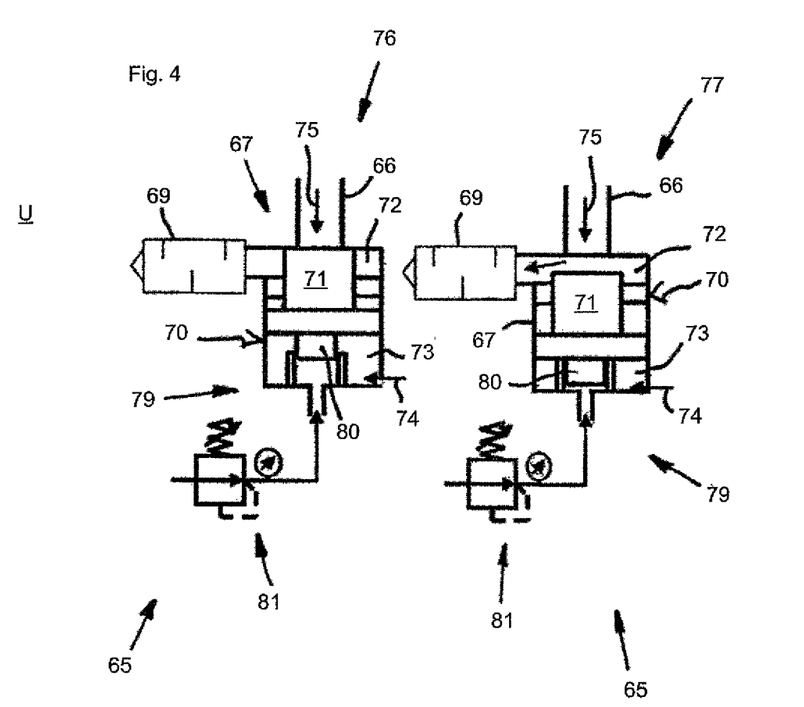
FIG. 4 shows a schematic view of a second embodiment example of a venting valve having a pressure drop safety device comprising a pneumatically pre-tensioned valve piston in the closed and the open positions.

The further venting device 65 as shown in FIG. 4 corresponds approximately to the venting device 65 from FIG. 3, and therefore identical components or identically acting components have been provided with identical reference numerals.

The difference lies in the type of pre-tension spring of the pressure drop safety device 68, which in this embodiment example is implemented as a pneumatic pre-tension spring 79, as a result of which the valve piston 71 can be moved in a contactless manner. The pneumatic pre-tension spring 79 has an additional control piston 80, with a spring pressure being adjusted by means of a pressure controller 81 in such a way that the venting valve 67 closes as soon as an anti-contamination pressure is reached.

Instead of the pressure controller 81, any existing control pressure 74 could be used. In this case, a piston diameter of the valve piston 71 has to be selected such that the venting valve 67 can close in an operationally safe manner when the anti-contamination pressure is reached.

Otherwise, the venting device 65 comprises a pressurised line section 66 of a blow station 8 of the moulding apparatus 1 from FIGS. 1 and 2, the venting valve 67 including a pressure drop safety device 68 and a sound absorber 69 for reducing a sound level whilst the process pressure or a recovery pressure is being vented. The venting valve 67 includes a valve cylinder 70, a valve piston 71, a connection chamber 72 and a control pressure chamber 73. Here, too, the control pressure 74 can be applied to the control pressure chamber 73, by means of which control pressure the valve piston 71 can be held in a closing position 76 against a process pressure 75. If the control pressure 74 is absent, the valve piston 71 is transferred into an open position 77 by the process pressure 75 and the process pressure 75 can be vented into the environment U via the sound absorber 69. By means of the pneumatic pre-tension spring 79, the valve piston 71 can be automatically transferred into the closing position 76 without the support of the control pressure 74, when the process pressure 75 drops down to a desired anti-contamination pressure.

Figure 5:
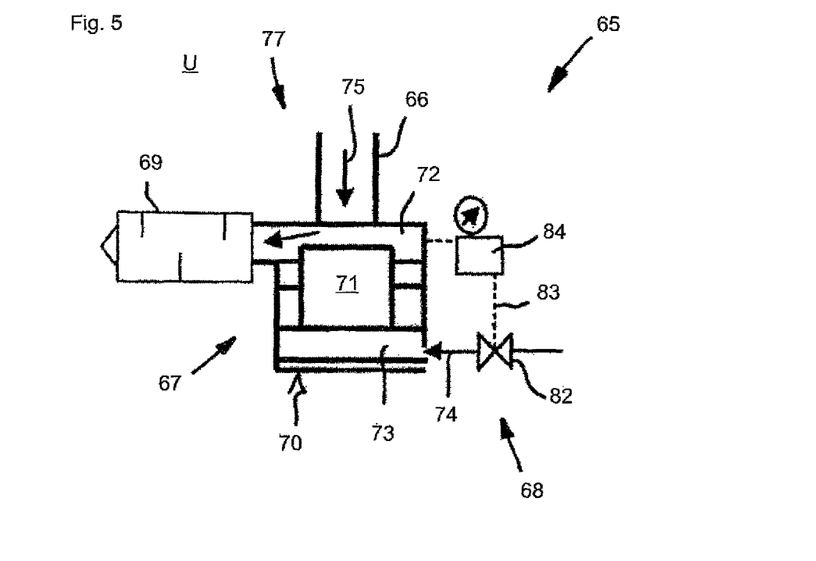
FIG. 5 shows a schematic view of a further embodiment example of a venting valve having a pressure drop safety device comprising over pressure detection for controlling a valve piston in the closed and the open positions.

The venting device 65 shown in FIG. 5 approximately corresponds to the venting devices from FIGS. 3 and 4, therefore identical components or identically acting components are again provided with identical reference numerals.

In this respect, the venting device 65 shown in FIG. 5 comprises a pressurised line section 66, a venting valve 67 having a pressure drop safety device 68 and a sound absorber 69. The venting valve 67 includes a valve cylinder 70, a valve piston 71, a connection chamber 72 and a control pressure chamber 73. A control pressure 74 can be applied to the control pressure chamber 73, by means of which control pressure the valve piston 71 can be held in a closing position (not shown here) against a process pressure 75.

The supply of the control pressure 74 is here carried out by means of a control valve 82 that is mounted upstream of the control pressure chamber 73. The control valve 82 is actuated via a control signal 83 that is provided by a pressure transducer 84. The pressure transducer 84 detects here the pressure conditions on the side of the pressurised line section 66 or the connection chamber 72.

If the control pressure 74 is removed by closing the control valve 82, the valve piston 71 is transferred into an open position 77 by the process pressure 75 and the process pressure 75 can be vented into the environment U via the sound absorber 69.

In this respect, the closing point of the venting valve 67 is controlled by a controller.

Figure 6:
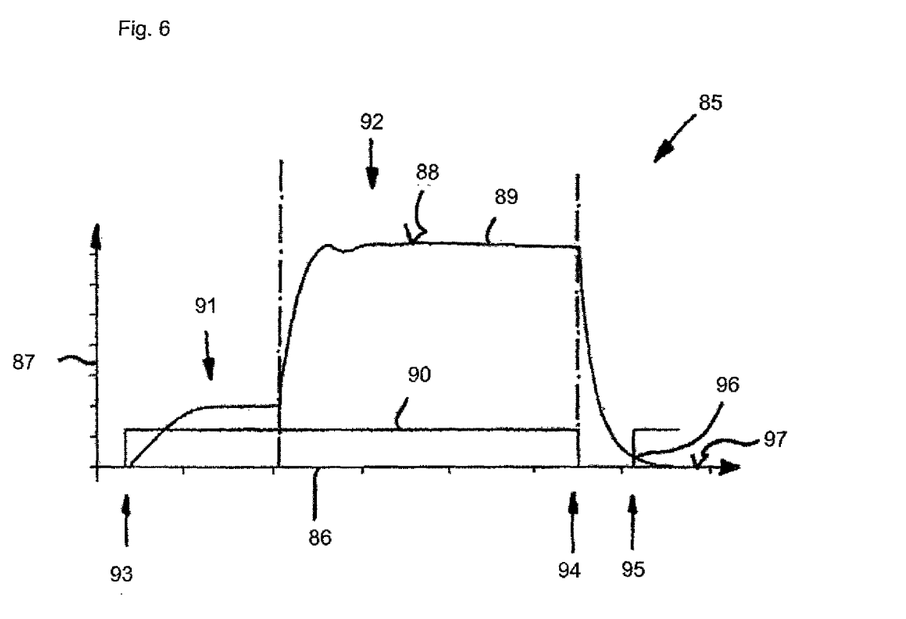
FIG. 6 shows a schematic view of a circuit diagram of a venting valve having a pressure drop safety device as a function of an operating pressure.

The diagram 85 shown in FIG. 6 has a time axis 86 and a pressure axis 87.

The diagram 85 shows a pressure curve 88 in relation to a process pressure 89 as well as a control valve signal 90.

The pressure curve 88 depicts a pre-mould pressure 91 and a finish-mould pressure 92.

If the control valve signal 90 is switched on at a time 93, the control pressure 74 is applied to the control pressure chamber 73 and the venting valve 67 closes. As a result, the process pressure 89 can rise and a plastic preform 10 can correspondingly be expanded.

If the control valve signal 90 is switched off at a later time 94, the venting valve 67 opens and the process pressure 89 is vented.

If the process pressure 89 reaches a predetermined anti-contamination pressure 96 at a venting time 95, the control valve signal 90 is again initiated and the venting valve 67 closes according to the invention before the atmospheric pressure level 97 particularly in the connection chamber 72 of the venting valve 67 is reached.

A forced venting of the low anti-contamination pressure 96 can then be carried out in particular from the container 10a for example by lifting up off a blow nozzle on the blow station 8.

FIG. 6 also shows the pressures for recycling and those which are derived via the sound absorber. Point P in the pressure curve identifies the recovery pressure.

All of the features disclosed in the application documents are claimed as being essential to the invention insofar as they are novel over the prior art either individually or in combination.

LIST OF REFERENCE NUMERALS

1 Moulding apparatus
2 Transport wheel, conveying device
4 Blow mould
5 Stretching rod
6 Blow mould carrier
8 Blow station
9 Guiding curve
10 Plastic preforms
10a Container
11 Follower device
12 Carriage
13 Base
15 Sealing device, sealing lip
17 Cover
18 Wall
19 Lateral wall, section
20 Clean room
21 Bracket
22 Supply device
23 Holding device
24 Discharge device
25 Sealing device
26 Carrier
27 Sealing device
28 Section
29 Holding body
30 Heating device
31 Heating element
32 Sterilisation device
34 Conveying device
36 Transfer unit
37 Transport wheel
40 Filling device
42 Transfer unit
44 Conveying unit
50 System
60 Application device
65 Venting device
66 Pressurised line section
67 Venting valve
68 Pressure drop safety device
69 Sound absorber
70 Valve cylinder
71 Valve piston
72 Connection chamber
73 Control pressure chamber
74 Control pressure
75 Process pressure
76 Closing position
77 Open position
78 Mechanical pre-tension spring
79 Pneumatic pre-tension spring
80 Control piston
81 Pressure controller
82 Control valve
83 Control signal
84 Pressure transducer
85 Diagram
86 Time axis
87 Pressure axis
88 Pressure curve
89 Process pressure
90 Control valve signal
91 Pre-mould pressure
92 Finish-mould pressure
93 Time
94 Later time
85 Venting time
96 Anti-contamination pressure
97 Atmospheric pressure level
X Axis
U Environment
L Line
Y Direction
P Recovery pressure

The invention claimed is:

1. An apparatus for moulding plastic preforms into finish-blown plastic containers, comprising a clean room having at least one blow station comprising a blow mould for shaping the plastic preforms using at least one process pressure, and comprising a venting device for venting or reducing the process pressure to a recovery pressure into the atmosphere, wherein the venting device comprises at least one venting valve through which the process pressure or the recovery pressure can be vented into the atmosphere via a sound absorber, wherein a pressure drop safety device for closing the venting valve before the atmospheric pressure level is reached is provided on the venting device, wherein the venting valve is closed at the latest when a predefined positive pressure is reached in the finish-blown plastic container.

2. The apparatus as claimed in claim 1, wherein the pressure drop safety device is arranged to maintain an anti-contamination pressure on the venting valve, said anti-contamination pressure being between the process or recovery pressure and atmospheric pressure.

3. The moulding apparatus as claimed in claim 1, wherein the pressure drop safety device for closing the venting valve comprises a mechanical pre-tension spring for a mechanically actuatable valve piston, in particular for a mechanically spring-loaded valve piston.

4. The apparatus as claimed in claim 3, wherein once a predefined process pressure in the plastic container is reached, the valve piston is displaced by spring force into a closing position.

5. The moulding apparatus as claimed in claim 1, wherein the pressure drop safety device for closing the venting valve comprises a pneumatic pre-tension spring for a valve piston that can be actuated in a contactless manner, in particular a pneumatically spring-loaded valve piston.

6. The apparatus as claimed in claim 5, wherein once a predefined process pressure in the plastic container is reached, the valve piston closes as a result of pneumatic pretension.

7. The moulding apparatus as claimed in claim 1, wherein the pressure drop safety device for closing the venting valve comprises a valve piston that can be actuated using a pneumatic control valve, said pneumatic control valve being controllable as a function of an anti-contamination pressure.

8. The apparatus as claimed in claim 7, wherein the venting valve has a pressure drop safety device comprising over-pressure detector for controlling a valve piston in closed or open positions.

9. The moulding apparatus as claimed in claim 1, wherein the pressure drop safety device is arranged to detect a process pressure or a recovery pressure on the clean room side and/or on the blow mould side.

10. The moulding apparatus as claimed in claim 1, wherein the pressure drop safety device comprises the venting valve.

11. An apparatus for moulding plastic preforms into finish-blown plastic containers, comprising a clean room having at least one blow station comprising a blow mould for shaping the plastic preforms using at least one process pressure, and comprising a venting device for venting or reducing the process pressure to a recovery pressure into the atmosphere, wherein the venting device comprises at least one venting valve through which the process pressure or the recovery pressure can be vented into the atmosphere via a sound absorber, wherein the venting device is at least temporarily in fluid connection with a finish-blown plastic container arranged in a blow station of the moulding apparatus by a pressurized line, wherein a pressure drop safety device for closing the venting valve before the atmospheric pressure level is reached is provided on the venting device, and wherein the venting valve can be set in a closed state by the pressure drop safety device when a predefined positive pressure is reached in the finish-blown plastic container.

* * * * *

UNITED STATES PATENT AND TRADEMARK OFFICE
CERTIFICATE OF CORRECTION

PATENT NO. : 9,004,904 B2  
APPLICATION NO. : 13/463650  
DATED : April 14, 2015  
INVENTOR(S) : Handschuh et al.

Page 1 of 1

It is certified that error appears in the above-identified patent and that said Letters Patent is hereby corrected as shown below:

On the title page item (75) Inventors: "Regonsburg (DE)" should be --Regensburg (DE)--

"Berstzhausen (DE)" should be --Beratzhausen (DE)--

Signed and Sealed this  
Fifth Day of January, 2016

Michelle K. Lee  
*Director of the United States Patent and Trademark Office*